US012006468B2

(12) United States Patent
Gotmukle et al.

(10) Patent No.: US 12,006,468 B2
(45) Date of Patent: Jun. 11, 2024

(54) MODIFIED VEGETABLE OIL AS FLUID LOSS CONTROL ADDITIVE

(71) Applicant: Halliburton Energy Services, Inc., Houston, TX (US)

(72) Inventors: Sharad Bhimrao Gotmukle, Pune (IN); Nivika Rajendra Gupta, Pune (IN); Jeffrey J Miller, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/167,304

(22) Filed: Feb. 10, 2023

(65) Prior Publication Data
US 2024/0059956 A1     Feb. 22, 2024

Related U.S. Application Data

(60) Provisional application No. 63/364,213, filed on May 5, 2022.

(51) Int. Cl.
*C09K 8/502*     (2006.01)
*E21B 21/00*    (2006.01)

(52) U.S. Cl.
CPC ............ *C09K 8/502* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 5,318,956 A | 6/1994 | Mueller et al. | |
| 6,187,719 B1 * | 2/2001 | Dino ................. | C09K 8/32 507/129 |
| 8,071,510 B2 | 12/2011 | Scoggins et al. | |
| 10,053,935 B2 | 8/2018 | Livescu et al. | |
| 2008/0220995 A1 | 9/2008 | Huang et al. | |
| 2016/0298015 A1 | 10/2016 | Gupta et al. | |

FOREIGN PATENT DOCUMENTS

| | | |
|---|---|---|
| CA | 2008006065 A1 | 1/2008 |
| CN | 107245329 A1 | 10/2017 |

* cited by examiner

*Primary Examiner* — Andrew Sue-Ako
(74) *Attorney, Agent, or Firm* — Sheri Higgins; Sheri Higgins Law, PLLC (57) ABSTRACT

Invert emulsions can be used in oil and gas operations. A fluid loss control additive (FLCA) is a component of the fluid that can be utilized to control or minimize fluid loss into a subterranean formation. The FLCA can be a chemically modified vegetable oil that is biodegradable. Vegetable oils having some or all of the functional groups sulfonated can be used as FLCA. A water-soluble salt that has been dissolved in the discontinuous phase of the invert emulsion can combine with the FLCA to form a wax-like, solid mass.

20 Claims, 3 Drawing Sheets

MODIFIED VEGETABLE OIL AS FLUID LOSS CONTROL ADDITIVE

TECHNICAL FIELD

Wellbore treatment operations can involve pumping a treatment fluid into a wellbore. The treatment fluid generally includes a liquid as the base fluid. During introduction into the wellbore, some of the base fluid can be lost into a subterranean formation that is penetrated by the wellbore. Improved fluid loss control additives can be used to reduce the amount of base fluid or filtrate that is lost.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed or discontinuous phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid. An emulsion has a continuous phase of water and immiscible liquid oil droplets as the dispersed or discontinuous phase or has a continuous phase of an oil and immiscible liquid water droplets as the dispersed or discontinuous phase. When naming an emulsion type, the first letter is the discontinuous phase. Accordingly, O/W is oil in water and is classified as an "emulsion"; whereas W/O is water in oil and is classified as an "invert emulsion".

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet (30.5 meters) radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The wellbore defines a wellbore wall that is the exposed portion of the subterranean formation where the wellbore was formed. The drilling fluid may be circulated downwardly through the drilling pipe and back up the annulus between the wellbore wall and the outside of the drilling pipe.

After a wellbore is formed, it may be desirable to perform a cementing operation. A treatment fluid called a spacer fluid can be introduced into the wellbore after the drilling fluid and before the cement composition. The spacer fluid can flush residual drilling fluid that may remain in parts of the wellbore or on the face of the subterranean formation to help ensure better bonding of the cement composition to the interface. Other types of oil or gas operations, for example, completion or workover operations can also be performed with a treatment fluid.

The wellbore wall and near-wellbore region of the subterranean formation can include permeable areas. Examples of permeable areas include cracks, natural fissures, fractures, vugs, interconnected pores, or induced fractures. Cracks, fissures, and fractures can generally be characterized as having a length greater than its diameter. Vugs and holes can be characterized as being any cavity having a variety of shapes and sizes. Porosity refers to the number of individual pores within an area of the subterranean formation. Permeability and all grammatical variations thereof, in this context, refers to the amount of interconnectivity between the individual pores that allows fluid to migrate or move between the interconnected pores. Permeable areas in the wall of the wellbore and near-wellbore region can vary and have dimensions ranging from less than 0.1 micrometers and as large as 50 micrometers or larger. As used herein, a "permeable area" means any area where fluid can flow into the subterranean formation via a wellbore and can be caused by—without limitation—cracks, fissures, fractures, cavities, and interconnected pores.

Some of the base fluid or filtrate of a treatment fluid can undesirably flow into the subterranean formation via the permeable areas instead of remaining in the wellbore and being circulated back up to the wellhead. This is known as fluid loss. In order to overcome the problems associated with fluid loss, a fluid loss control additive can be used. As the treatment fluid is placed into the well, the fluid loss control additive can eliminate or lessen the amount of liquid base fluid or filtrate entering the subterranean formation.

Fluid loss control additives can form a filtercake on the wall of the wellbore to reduce or stop fluid loss. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes materials including water, a gelling agent, calcium carbonate, weighting agents, and/or polymers, is introduced into the open-hole wellbore. The fluid flows into a desired portion of the well. The ingredients in the fluid form the filtercake. The filtercake can be used to bind fines, such as sand, together, and prevent fluid loss into the subterranean formation.

Synthetic substances can be used as a fluid loss control additive. However, environmental regulations can limit which ingredients can be used in oil or gas operations. Thus, there is a need for new fluid loss control additives that can be used to treat fluid loss that are more environmentally friendly and comply with environmental regulations.

It has been discovered that an invert emulsion treatment fluid including a biodegradable fluid loss control additive can be used during wellbore operations. Inherent biodegradability refers to tests, which allow prolonged exposure of the test substance to microorganisms. As used herein, a material with a biodegradation rate of >20% is regarded as "inherently primary biodegradable." A material with a biodegradation rate of >70% is regarded as "inherently ultimate biodegradable." A material can be considered "biodegradable" if the material is either, regarded as inherently primary biodegradable or inherently ultimate biodegradable. As used herein, the "inherent biodegradability" of a substance is tested in accordance with OECD guidelines, using the 302 B-1992 Zahn-Wellens test as follows. The test substance, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no test substance, is run in parallel. The biodegradation process is monitored by determination of DOC (or COD(2)) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

If any laboratory test (e.g., rheology or fluid loss) requires the step of mixing, then the drilling fluid is mixed according to the following procedures. A known volume (in units of scaled barrels) of the base fluid is added to a mixing container and the container is then placed on a mixer base. The motor of the base is then turned on and maintained at 11,200 to 11,800 revolutions per minute (rpm). Any of the following ingredients are then added to the base fluid to form a drilling fluid and mixed for at least 5 minutes before adding the next ingredient, wherein the ingredients are added in order of the first ingredient to last ingredient as follows: an emulsifier; a viscosifier; a filtration control agent; an aqueous liquid; then optionally a shale stabilizer additive; a weighting agent; and a pH buffer. The ingredients can be added at a stated concentration of weight by volume of the drilling fluid, for example, in units of pounds per barrel of the drilling fluid. It is to be understood that any mixing is performed at ambient temperature and pressure—about 71° F. (22° C.) and about 1 atm (0.1 MPa).

It is also to be understood that if any laboratory test (e.g., rheology or fluid loss) requires the test be performed at a specified temperature and possibly a specified pressure, then the temperature and pressure of the drilling fluid is ramped up to the specified temperature and pressure after being mixed at ambient temperature and pressure. For example, the drilling fluid can be mixed at 71° F. (22° C.) and 1 atm (0.1 MPa) and then placed into the testing apparatus and the temperature of the drilling fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the drilling fluid is ramped up to the specified temperature and possibly pressure, the drilling fluid is maintained at that temperature and pressure for the duration of the testing.

A drilling fluid should exhibit good rheological properties. Rheology is a measure of how a material deforms and flows. As used herein, the "rheology" of a drilling fluid is measured according to ANSI/API 13B-2 section 6.3, Recommended Practice for Field Testing of Oil-based Drilling Fluids as follows. The drilling fluid is mixed. The drilling fluid is placed into the test cell of a rotational viscometer, such as a FANN® Model 35 or 45 viscometer, fitted with a Bob and Sleeve attachment and a F1 spring number. The drilling fluid is tested at the specified temperature and ambient pressure, about 1 atm (0.1 MPa). Rheology readings are taken at multiple revolutions per minute "rpm," for example, at 3, 6, 100, 200, 300, and 600.

As used herein, the "plastic viscosity" of a drilling fluid is obtained from the Bingham-Plastic rheological model and calculated as the difference between the 600 rpm and 300 rpm dial readings from the rheology testing, expressed in units of centipoise (cP).

Rheology measurements can be performed before hot rolling (BHR) or after hot rolling (AHR). As used herein, "hot rolling" is performed according to ANSI/API 131 section 26.8, Recommended Practice for Laboratory Testing of Drilling Fluids as follows. Samples of the drilling fluid shall be hot-rolled for 16 hours at 120° C. (250° F.), or other specified temperature, in a preheated hot-rolling oven. Pressurization of the hot-roll cell with nitrogen can be used. After 16 h of hot rolling, switch off the oven heat and open the oven door. Roll the samples during the cooling period for at least 30 min prior to removal. Subsequently, cool in ambient air for an additional 30 min. Then cool the cell to ambient temperature by partially immersing the cell in water.

The yield point ("YP") is defined as the value obtained from the Bingham-Plastic rheological model when extrapolated to a shear rate of zero. As used herein, the "yield point" of a drilling fluid is calculated as the difference between the plastic viscosity and the 300-rpm dial reading, expressed in units of pounds per 100 square feet (lb/100 ft$^2$). To convert the units to pascals (Pa), the difference is multiplied by 0.48. Similarly, the yield stress or Tau zero is the stress that must be applied to a material to make it begin to flow (or yield) and may commonly be calculated from rheometer readings measured at rates of 3, 6, 100, 200, 300 and 600 rpm. The extrapolation in this case may be performed by applying a least-squares fit or curve fit to the Herchel-Bulkley rheological model.

A substance can develop gel strength. As used herein, the "10 s gel strength" of a drilling fluid is measured according to ANSI/API 13B-2, Fourth edition, section 6.3, Recommended Practice for Field Testing Oil-Based Drilling Fluids as follows. After the rheology testing of the drilling fluid is performed, the drilling fluid is allowed to sit in the test cell for 10 seconds (s). Slowly and steadily turn the hand-wheel in the appropriate direction to produce a positive dial reading. Record the maximum reading as the initial gel strength. For instruments having a 3 r/min speed, the maximum reading attained after starting rotation at 3 r/min is the initial gel strength. Record the initial gel strength (10-second gel) in lb/100 ft$^2$. As used herein, the "10 min gel strength" is measured as follows. After the 10 s gel strength test has been performed, restir the drilling fluid sample at 600 r/min for 10 s and then allow the drilling fluid to stand undisturbed for 10 min. Repeat the measurements as in the 10 s gel strength and report the maximum reading as the 10 min gel strength in lb/100 ft$^2$. To convert the dial reading from pounds per 100 square feet to Pa: 1 Pa=0.48 lb/100 ft$^2$.

Another desirable property of a drilling fluid is low fluid loss. As used herein, the "high-temperature/high pressure fluid loss" of a drilling fluid is tested according to ANSI/API 13B-2, Fourth edition, section 7.2, Recommended Practice for Field Testing of Oil-based Drilling Fluids procedure at a specified temperature and pressure differential as follows. The drilling fluid is mixed. The drilling fluid is stirred for 5 min using a multi-mixer. The drilling fluid is poured into the filter cell. The testing apparatus is assembled with a filter paper inserted into the apparatus. The specified pressure differential is set. When the sample reaches the selected test temperature, the lower valve stem is opened, and the pressure is immediately increased on the upper regulator to 500 psi higher than the backpressure. A timer is started. The testing is performed for 30 min. Filtrate is collected from the test cell in a graduated cylinder and corrected to the filter area. Fluid loss is measured in milliliters (mL) of fluid collected in 30 min. HT/HP filter cells usually have half the standard filter area, so the volume collected is multiplied by 2 to convert to the total volume collected.

For evaluation purposes, the "filtrate reduction" can be calculated. The calculation can be performed to determine the performance of a test fluid loss control additive compared to a control sample. The control sample can be an identical fluid without any fluid loss control additive or an identical fluid with a different fluid loss control additive. The filtrate reduction is calculated using equation 1 below with the total fluid loss (TFL) of the control and test fluids and expressed in units of %.

$$\text{Filtrate reduction}=[(\text{control TFL}-\text{test TFL})/\text{control TFL}]\times 100 \quad \text{Eq. 1}$$

Another desirable property of a drilling fluid is electrical stability. As used herein, the "electrical stability" of a drilling fluid is tested according to ANSI/API 13B-2, Fourth edition, section 10.4, Recommended Practice for Field Testing of Oil-Based Drilling Fluids procedure at a specified temperature and pressure differential as follows. Mix the drilling fluid. Screen the drilling fluid sample through a Marsh funnel. Place the drilling fluid sample in a viscometer cup maintained at 50° C.±2° C. (120° F.±5° F.). Record the drilling fluid temperature. Clean the electrode probe body of an electrical stability (ES) meter thoroughly by wiping with a clean paper towel. Pass the towel through the electrode gap a few times. Swirl the electrode probe in the base oil used to formulate the drilling fluid. If the base oil is not available, another oil or a mild solvent, such as isopropanol, is acceptable. Clean and dry the electrode probe as before. Hand-stir the 50° C. (120° F.) drilling fluid sample with the electrode probe for approximately 10 s to ensure that the composition and temperature are uniform. Position the electrode probe so that it does not touch the bottom or sides of the container and be sure that the electrode surfaces are completely covered by the sample. Begin the voltage ramp test. Follow the procedure described in the ES meter operating manual. Do not move the electrode probe during the voltage ramp test. At the conclusion of the ramp test, note the ES value displayed on the readout device. Repeat the procedure with the same drilling fluid sample. The two ES values should not differ by more than 5%. If they differ by more than 5%, check the meter or electrode probe for malfunction. Record the average of the two ES measurements.

A treatment fluid can include a base fluid, monovalent or divalent salt, and a fluid loss control additive.

Methods of treating a subterranean formation can include introducing the treatment fluid into the subterranean formation and causing or allowing the fluid loss control additive to reduce loss of the base fluid into permeable areas of the subterranean formation.

It is to be understood that the discussion of any of the embodiments regarding the treatment fluid or any ingredient in the treatment fluid is intended to apply to all of the method and composition embodiments without the need to repeat the various embodiments throughout. Any reference to the unit "gallons" means U.S. gallons.

The treatment fluid can be used in a variety of oil or gas operations. The treatment fluid can be, for example, a drilling fluid, a spacer fluid, a workover fluid, a stimulation fluid, or a cement composition.

The treatment fluid can be an invert emulsion. The treatment fluid includes a base fluid. The base fluid can include dissolved materials or undissolved solids. The base fluid can include a hydrocarbon liquid as the continuous phase of the invert emulsion. The hydrocarbon liquid can be selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The treatment fluid can include water. The water can be the dispersed or discontinuous phase of the invert emulsion. The water can be selected from the group consisting of freshwater, seawater, brine, and any combination thereof in any proportion. The treatment fluid further includes a water-soluble salt. The water-soluble salt can be a monovalent salt or divalent salt. The water-soluble salt can be selected from the group consisting of sodium chloride, calcium chloride, calcium bromide, potassium chloride, potassium bromide, magnesium chloride, sodium formate, potassium formate, cesium formate, zinc bromide, and any combination thereof. The treatment fluid can have a desired water phase salinity (WPS). Water phase salinity is a factor showing the activity level of salt in an oil-based drilling fluid (invert emulsion fluid) and can indicate the concentration of dissolved salt in the brine droplets within the fluid. The treatment fluid can have a water phase salinity in the range of about 100,000 to about 400,000 parts per million (ppm).

The treatment fluid can also have a desired oil-to-water ratio. The treatment fluid can have an oil-to-water ratio (OWR) in the range of 60:40 to 90:10. The oil-to-water ratio can be selected such that the oil (hydrocarbon liquid) of the base fluid is in the largest proportion and forms the continuous phase of the invert emulsion treatment fluid.

The treatment fluid includes a fluid loss control additive. The fluid loss control additive can be biodegradable. The fluid loss control additive can meet environmental regulations. By way of example, regulatory framework for North Sea waters requires that fluid components must meet or exceed toxicity and biodegradability ratings (among other criteria) for permitted use in oil and gas drilling and completion operations. Additives that can be used would be designated as green or yellow color bands according to the OSPAR Commission. Additives not meeting these standards are rated red and flagged for future substitution, meaning they are scrutinized during the permitting process. Products with such a substitution warning are subject to removal once viable replacements are identified with more favorable environmental characteristics. Approved additives can be used for drilling with cuttings discharge in some areas if the waste meets the limits for retained non-aqueous fluid. In the North Sea example, there is no discharge of the cuttings because it is offshore drilling; however, the regulations are still applied in view of the risks for minor contamination into the North Sea waters. Accordingly, the fluid loss control additive in the treatment fluid can be used to replace other fluid loss control additives that are rated red and flagged for future substitution, such as synthetic fluid loss control additives.

The fluid loss control additive can be a vegetable oil. A non-limiting example of a vegetable oil is castor oil, soybean oil, peanut oil, or olive oil. The vegetable oil can be selected such that it forms a wax-like complex in the presence of the water-soluble salt. According to any of the embodiments, the vegetable oil is not a salt of the vegetable oil. According to any of the embodiments, the vegetable oil is insoluble in freshwater but can be dispersible in freshwater. As used herein, "insoluble" means the ingredient does not dissolve and does not merge with the substance it is placed into (e.g., the vegetable oil will not dissolve and merge with freshwater). As used herein, "dispersible" means the ingredient does not merge with the substance it is placed into, but can be dispersed or distributed within the substance—possibly requiring agitation to disperse the ingredient (e.g., the vegetable oil can be dispersed throughout the freshwater).

Figure 1:
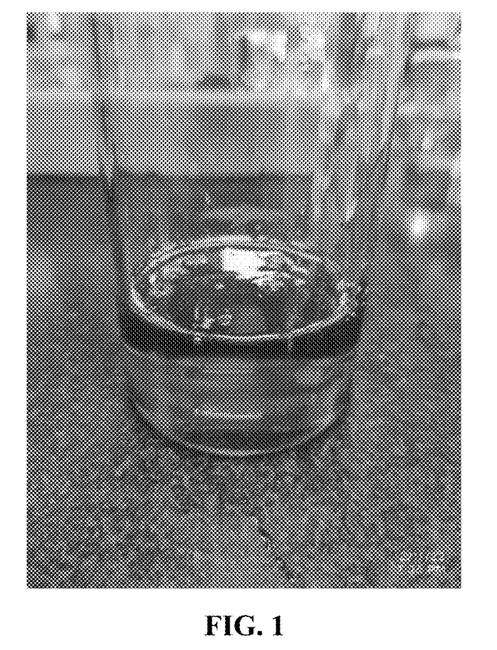
FIGS. 1 and 2 are photographs of a chemically modified sulfonated castor oil as a fluid loss control additive according to certain embodiments.
Figure 2:
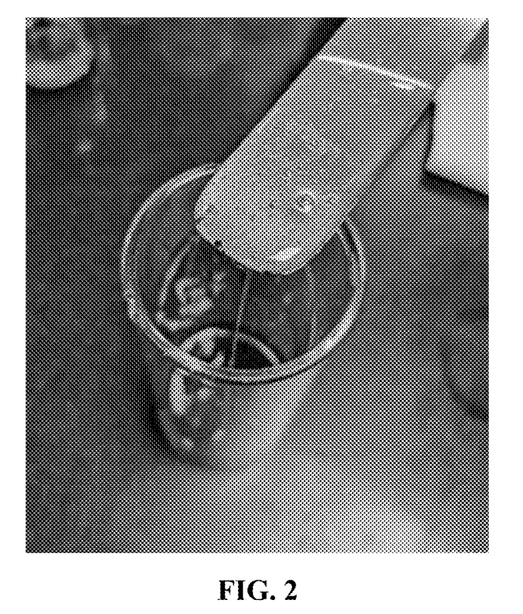

One or more functional groups of the vegetable oil can be chemically modified. A non-limiting example of a chemical modification is sulfonation of the one or more functional groups of the vegetable oil. The functional groups that can be chemically modified are hydroxyl groups (—OH). Hydroxyl groups may be easier to chemically modify compared to compounds with unsaturated double bonds (=) present. Chemical modification can be achieved by reacting the vegetable oil with an acid or other compound. A non-limiting example of a chemical modification of castor oil with sulfuric acid to produce Turkey red oil is shown below in Eq. 2. FIGS. 1 and 2 are photographs of Turkey red oil, showing a clear, amber liquid that is dispersible in water and oil. As shown below, all three of the hydroxyl functional groups of the castor oil are sulfonated. However, fewer than all of the functional groups can be chemically modified. The chemically modified vegetable oil may be dispersible in fresh water but becomes insoluble when added to water containing the water-soluble salt such that a wax-like complex is formed.

Eq. 2

Sulphated castor oil (Turkey red oil)

The fluid loss control additive can be used in a concentration in the range of 0.2 to 10 pounds per barrel (ppb) of the base fluid. The concentration of the fluid loss control additive can also be selected such that a wax-like complex forms and can be based in part on the water phase salinity of the discontinuous phase and the desired level of filtration control.

The fluid loss control additive can react with the monovalent or divalent salt to form a wax-like complex. According to any of the embodiments, the wax-like complex is insoluble in the brine (discontinuous) phase of the invert emulsion. Waxes are a diverse class of organic compounds that are lipophilic and malleable near ambient temperatures. A chemically modified vegetable oil as the fluid loss control additive contains fatty acid functional groups that can form a wax-like complex in the presence of monovalent or divalent salts dissolved in water. Without being limited by theory, it is believed that chemical modification of the vegetable oil enables or accelerates the formation of the wax-like complex. The wax-like complex that is formed can have a melting point. As used herein, a "melting point" includes a single temperature and a range of temperatures at which the substance undergoes a phase change from a solid or semi-solid to a liquid. According to any of the embodiments, the treatment fluid is introduced into a wellbore having a bottomhole temperature less than the melting point of the wax-like complex. As used herein, the term "bottomhole" means at the location within the wellbore or subterranean formation where fluid loss control is needed.

The fluid loss control additive can be used to inhibit or prevent fluid loss from the wellbore into the formation via the permeable areas. It should be understood that while some of the base fluid or the filtrate may penetrate into the subterranean formation, the fluid loss control additive should provide the desired fluid loss control. The wax-like complex that is formed can be used to inhibit or prevent fluid loss from the wellbore into the formation via the permeable areas.

There can be a multitude of permeable areas comprising the same or different types of voids, such as fractures, fissures, vugs, or interconnected pores. The dimensions of the permeable areas can be different. By way of example, a fracture may have a length that is greater than 50 micrometers; while pores may have dimensions around 1 micrometer. The fluid loss control additive may prevent or reduce fluid loss into any of the permeable areas regardless of the dimensions of the permeable areas.

According to any of the embodiments, the fluid loss control additive provides a desired fluid loss control. For example, a desired fluid loss control can be at least 60%, 70%, 80%, or 90% by volume of the invert emulsion fluid is not lost through the permeable areas of the subterranean formation. The treatment fluid can have an HP/HT fluid loss less than 15 milliliters per 30 minutes (mL/30 min) at testing temperatures of 93.3° C. to 176.7° C. (200° F. to 350° F.). The treatment fluid can also have an HP/HT fluid loss less than about 6 mL/30 min at testing temperatures of 93.3° C. to 176.7° C. (200° F. to 350° F.).

A test treatment fluid can be used to determine the predicted performance of whether a treatment fluid provides the desired fluid loss control. As used herein, a "test treatment fluid" means a test fluid consisting of identical ingredients and in the same concentration as the treatment fluid. As used herein, a "control test fluid" means a fluid consisting of identical ingredients except without the fluid loss control additive and in the same concentration as the test treatment fluid. Different test treatment fluids can also be tested, and the filtrate reduction can be calculated to determine the efficiency and performance of the fluid loss control additive compared to a control or other fluid loss control additive that are not able to be used due to environmental regulations. Accordingly, the filtrate reduction can be calculated to determine the performance of the fluid loss control additive against a control and compared against other fluid loss control additives versus a control that do not meet environmental regulations. In a best-case scenario, an exemplary fluid loss control additive (FLCA) could theoretically provide a reduction in filtrate such that a value of zero filtrate is obtained, which would yield a filtrate reduction of 100%. By contrast, a filtrate reduction in the range of 0% to 35% would designate poor functioning materials, which are not suitable for industrial use. It is generally desirable to have a control fluid which shows a suitably moderate to high volume of filtrate to lend contrast to the filtrate reductions which may be provided by testing various FLCA materials. Therefore, it is advisable to perform such laboratory testing in multiple, different base fluids to ensure the functional performance of candidate FLCA is applicable to several different drilling environments. According to any of the embodiments, a test treatment fluid provides a filtrate reduction compared to a control test fluid that is identical to the test treatment fluid but does not include the fluid loss control additive in the range of 40% to 100%. According to any of the embodiments, the test treatment fluid provides a filtrate reduction within +/−20% of a second test fluid versus a control, wherein the second test fluid includes a fluid loss control additive that is labeled as red and flagged for future substitution. In other words, if a synthetic fluid loss control additive is flagged for future substitution and the filtrate reduction of the synthetic FLCA is calculated to be 85% compared to a control fluid, then the test treatment fluid including the chemically modified vegetable oil can preferably be in the range of 68% to 100%, which is within +/−20% of 85%.

It is to be understood that while the treatment fluid can contain other ingredients, it is the fluid loss control additive that is primarily or wholly responsible for providing the requisite fluid loss control. For example, a "test treatment fluid" that is identical to the treatment fluid can have the desirable fluid loss control. Therefore, it is not necessary for the treatment fluid to include other additives to achieve the desired fluid loss control. It is also to be understood that any discussion related to a "test treatment fluid" is included for purposes of demonstrating that while the treatment fluid being introduced into a wellbore may contain other ingredients, it is the fluid loss control additive that provides the desired fluid loss control. Therefore, while it may not be possible to perform a test in a wellbore for the specific treatment fluid being introduced, one can formulate a test treatment fluid to be tested in a laboratory to identify if the ingredients and concentration of the ingredients will provide the desired fluid loss control.

The treatment fluid can also contain other ingredients. The other ingredients can be insoluble particles, for example: ground coal; petroleum coke; sized calcium carbonate; barite; ilmenite; hematite; manganese tetroxide; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; ground nut shells, for example walnut, almond, or pecan; ground seed shells, for example sunflower seed shells; ground fruit pits; clay; silica; alumina; fumed carbon; carbon black; recycled carbon black; graphite; mica; titanium oxide; meta-silicate; calcium silicate; kaolin; talc; zirconia; boron; fly ash; a hollow glass microsphere; any composite particle thereof; and any combination thereof. The other ingredients can also be: ingredients that chemically react to form a cementitious substance, for example, diatomaceous earth, lime, and silica; a viscosifier; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a filter cake breaker; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

The treatment fluid can have desirable properties that can affect the pumpability and suspending capability of the fluid. The treatment fluid can have a plastic viscosity in the range of 10 to 90 centipoise (cP), or 20 to 70 cP at a temperature of 120° F. (48.9° C.). The plastic viscosity can also be in a range such that the treatment fluid is pumpable. The treatment fluid can have a yield point in the range of 2 to 40 pounds per 100 sq. ft. (lb/100 ft$^2$) (0.96 to 19.2 Pa) at a temperature of 120° F. (48.9° C.). The treatment fluid can also have a yield point in a range such that insoluble materials are suspended in the base fluid. The treatment fluid can have a 10 sec gel strength in the range of 1 to 30 lb/100 ft$^2$ (0.48 to 14.4 Pa) and a 10 min gel strength in the range of 1 to 50 lb/100 ft$^2$ (0.48 to 24 Pa) at a temperature of 120° F. (48.9° C.). The treatment fluid can have a desired electrical stability in the range of 200 to 1,700 volts (V).

The methods can include mixing the base fluid, the monovalent or divalent salt, and fluid loss control additive together. According to any of the embodiments, the methods include the step of introducing the treatment fluid into a subterranean formation. The subterranean formation can be penetrated by a wellbore. The well can be an oil, gas, or water production well, a geothermal well, or an injection well. The well can be an on-shore well or an off-shore well. The well includes the wellbore. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The well can include an annulus. The step of introducing the treatment fluid can include introducing the treatment fluid into a portion of the annulus. The treatment fluid can also be a spacer fluid, a workover fluid, a stimulation fluid, or a cement composition. The methods can also include introducing one or more additional fluids before and/or after the step of introducing the treatment fluid.

An embodiment of the present disclosure is a treatment fluid comprising: a continuous phase comprising a hydrocarbon liquid; a discontinuous phase comprising water and a water-soluble salt; and a fluid loss control additive, wherein the fluid loss control additive is a water-insoluble vegetable oil, and wherein one or more functional groups of the vegetable oil are chemically modified to form a chemically modified vegetable oil, wherein the treatment fluid has a high-pressure, high-temperature fluid loss less than 15 milliliters per 30 minutes at a testing temperature in the range of 93.3° C. to 176.7° C. Optionally, the hydrocarbon liquid is selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Optionally, the water is selected from the group consisting of freshwater, seawater, brine, and any combination thereof in any proportion. Optionally, the water-soluble salt is a monovalent salt or divalent salt selected from the group consisting of sodium chloride, calcium chloride, calcium bromide, potassium chloride, potassium bromide, magnesium chloride, sodium formate, potassium formate, cesium formate, zinc bromide, and any combination thereof. Optionally, the treatment fluid has a water phase salinity in the range of 100,000 to 400,000 parts per million. Optionally, the treatment fluid is an invert emulsion having an oil-to-water ratio in the range of 60:40 to 90:10. Optionally, the vegetable oil is comprised of an oil selected from the group consisting of castor oil, soybean oil, peanut oil, olive oil, and combinations thereof. Optionally, the fluid loss control additive is biodegradable. Optionally, chemical modification is sulfonation of the one or more functional groups of the vegetable oil. Optionally, the fluid loss control additive comprises Turkey red oil. Optionally, the fluid loss control additive is in a concentration in the range of 0.2 to 10 pounds per barrel (0.8 to 38.7 kilograms per cubic meter) of the base fluid. Optionally, the fluid loss control additive is configured to react with the water-soluble salt to form a wax-like complex. Optionally, the chemically modified vegetable oil contains fatty acid functional groups that are configured to react with the water-soluble salt to form the wax-like complex. Optionally, a test treatment fluid provides a filtrate reduction compared to a control test fluid in the range of 40% to 100%. Optionally, the treatment fluid has a plastic viscosity in the range of 10 to 90 centipoise at a temperature of 120° F. (48.9° C.). Optionally, the treatment fluid has a yield point in the range of 2 to 30 lb/100 ft$^2$ (0.96 to 14.36 Pascals) at a temperature of 120° F. (48.9° C.).

Another embodiment of the present disclosure is a method of treating a portion of a subterranean formation comprising: introducing a treatment fluid into a wellbore that penetrates the subterranean formation, the treatment fluid comprising: a continuous phase comprising a hydrocarbon liquid; a discontinuous phase comprising water and a water-soluble salt; and a fluid loss control additive, wherein the fluid loss control additive is a water-insoluble vegetable oil, and wherein one or more functional groups of the vegetable oil are chemically modified to form a chemically modified vegetable oil, wherein the treatment fluid has a high-pressure, high-temperature fluid loss less than 15 milliliters per 30 minutes at a testing temperature in the range of 93.3° C. to 176.7° C.; and causing or allowing the fluid loss control additive to reduce fluid loss of the continuous phase and the discontinuous phase of the treatment fluid into the subterranean formation. Optionally, the hydrocarbon liquid is selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Optionally, the water is selected from the group consisting of freshwater, seawater, brine, and any combination thereof in any proportion. Optionally, the water-soluble salt is a monovalent salt or divalent salt selected from the group consisting of sodium chloride, calcium chloride, calcium bromide, potassium chloride, potassium bromide, magnesium chloride, sodium formate, potassium formate, cesium formate, zinc bromide, and any combination thereof. Optionally, the treatment fluid has a water phase salinity in the range of 100,000 to 400,000 parts per million. Optionally, the treatment fluid is an invert emulsion having an oil-to-water ratio in the range of 60:40 to 90:10. Optionally, the vegetable oil is comprised of an oil selected from the group consisting of castor oil, soybean oil, peanut oil, olive oil, and combinations thereof. Optionally, the fluid loss control additive is biodegradable. Optionally, chemical modification is sulfonation of the one or more functional groups of the vegetable oil. Optionally, the fluid loss control additive comprises Turkey red oil. Optionally, the fluid loss control additive is in a concentration in the range of 0.2 to 10 pounds per barrel (0.8 to 38.7 kilograms per cubic meter) of the base fluid. Optionally, the fluid loss control additive is configured to react with the water-soluble salt to form a wax-like complex. Optionally, the chemically modified vegetable oil contains fatty acid functional groups that are configured to react with the water-soluble salt to form the wax-like complex. Optionally, a test treatment fluid provides a filtrate reduction compared to a control test fluid in the range of 40% to 100%. Optionally, the treatment fluid has a plastic viscosity in the range of 10 to 90 centipoise at a temperature of 120° F. (48.9° C.). Optionally, the treatment fluid has a yield point in the range of 2 to 30 lb/100 ft² (0.96 to 14.36 Pascals) at a temperature of 120° F. (48.9° C.). Optionally, the wellbore has a bottomhole temperature less than a melting point of the wax-like complex. Optionally, less than 40% of the of the continuous phase and the discontinuous phase of the treatment fluid by volume is lost through permeable areas of the subterranean formation.

EXAMPLES

To facilitate a better understanding of the various embodiments, the following examples are given.

Figure 3:
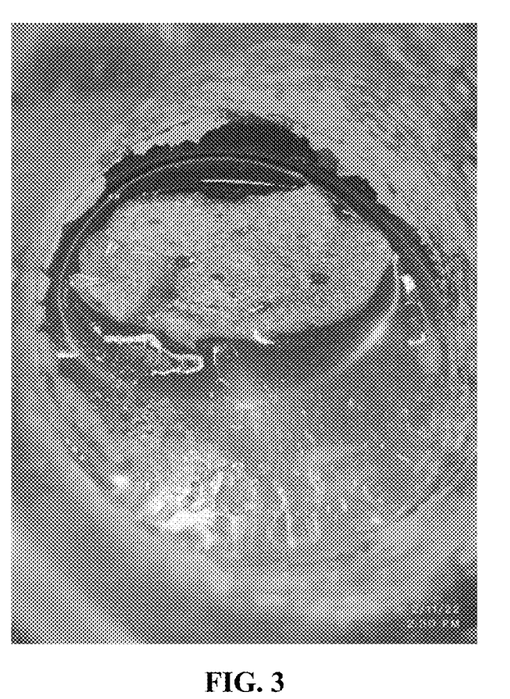
FIG. 3 is a photograph of the fluid loss control additive of FIG. 1 showing formation of a semi-solid, wax-like complex in the presence of a water-soluble salt.
Figure 4:
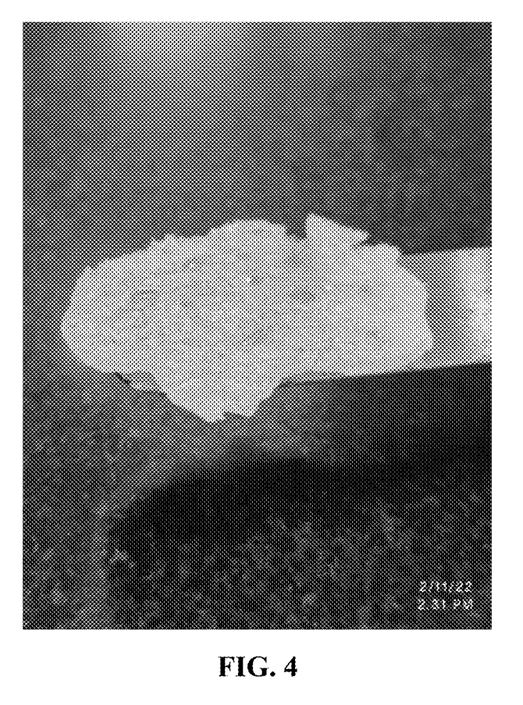
FIG. 4 is a photograph of the complex of FIG. 3 showing formation of a solid, wax-like complex after a period of time had passed.

FIG. 3 shows an immediate formation of a semi-solid, wax-like complex sticking on the inside of a mixing container after 3 grams (g) of Turkey red oil was added to a brine solution containing 34.3 grams of calcium chloride dissolved in 84.5 mL of water. FIG. 4 shows the wax-like complex forming a completely solid mass after at least 5 minutes had passed.

It was expected that castor oil would react with a solubilized monovalent or divalent salt to form a wax-like complex. However, when a non-chemically modified castor oil was tested, no wax-like complex formed. It was unexpectedly discovered that chemically modifying the vegetable oil not only formed a wax-like complex in the brine, but also provided comparable fluid loss control when compared to the best-performing synthetic fluid loss control additive as evidenced in Tables 1-3 below. The control fluid did not include a fluid loss control additive ("FLCA"). A synthetic copolymer resin fluid loss control additive ("Synthetic") that is considered to be the best-performing fluid loss control additive was tested against Turkey red oil ("TRO"), which is a completely sulfonated castor oil. The base oil was an isomerized internal olefin. The ingredients are listed in order of addition with the mixing time after each addition denoted in the time column.

TABLE 1

| (Mud Weight 14 ppg, OWR 75:25, WPS 230,000 ppm) | | | | |
| --- | --- | --- | --- | --- |
| Products (in order of addition) | Time (min) | Control | Synthetic | TRO |
| Base Oil, ppb | 5 | 141.86 | 141.86 | 141.86 |
| Emulsifier, ppb | | 12 | 12 | 12 |
| Lime, ppb | 5 | 2 | 2 | 2 |
| Water, ppb | 10 | 64.5 | 64.5 | 64.5 |
| CaCl$_2$, ppb | | 20.05 | 20.05 | 20.05 |
| FLCA, ppb | 5 | 0 | 3 | 5 |
| Suspension agent, ppb | 5 | 5 | 5 | 5 |
| Rheology modifier, ppb | 10 | 0.5 | 0.5 | 0.5 |
| Weighting agent, ppb | 20 | 344.08 | 344.08 | 344.08 |
| Mixing & Aging Parameters | | | | |
| Mixer Type/mixed volume | | Multimixer/1 bbl | | |
| Properties | | BHR | BHR | BHR |
| Rheology @ 120° F. | | | | |
| 600 rpm | | 66 | 72 | 55 |
| 300 rpm | | 41 | 44 | 32 |
| 200 rpm | | 32 | 35 | 24 |
| 100 rpm | | 22 | 24 | 16 |
| 6 rpm | | 9 | 10 | 5 |
| 3 rpm | | 8 | 8 | 4 |
| PV, cP | | 25 | 28 | 23 |
| YP, lb/100 ft² | | 16 | 16 | 9 |

TABLE 1-continued (Mud Weight 14 ppg, OWR 75:25, WPS 230,000 ppm)

| Products (in order of addition) | Time (min) | Control | Synthetic | TRO |
|---|---|---|---|---|
| 10 sec gel strength, lb/100 ft² | | 10 | 11 | 5 |
| 10 min gel strength, lb/100 ft² | | 21 | 22 | 17 |
| ES, volts | | 405 | 411 | 341 |
| HT/HP fluid loss @ 300° F. (149° C.), filter paper | | | | |
| Total fluid loss, mL | | 12 | 6 | 6.6 |
| Filtrate Reduction, % | | | 50% | 45% |

As can be seen in Table 1, the fully sulfonated castor oil ("TRO") performed almost as effectively as the synthetic fluid loss control additive before hot rolling, with a filtrate reduction only 5% less than the synthetic. Moreover, because the synthetic FLCA may not be used due to environmental regulations, this shows that the TRO can be used to replace the synthetic FLCA in oil and gas operations.

TABLE 2

(Mud Weight 14 ppg, OWR 75:25, WPS 230,000 ppm)

| Products (in order of addition) | Time (min) | Control | Synthetic | TRO |
|---|---|---|---|---|
| Base Oil, ppb | 5 | 141.86 | 141.86 | 141.86 |
| Emulsifier, ppb | | 12 | 12 | 12 |
| Lime, ppb | 5 | 2 | 2 | 2 |
| Water, ppb | 10 | 64.5 | 64.5 | 64.5 |
| CaCl₂, ppb | | 20.05 | 20.05 | 20.05 |
| FLCA, ppb | 5 | 0 | 3 | 5 |
| Suspension agent, ppb | 5 | 5 | 5 | 5 |
| Rheology modifier, ppb | 10 | 0.5 | 0.5 | 0.5 |
| Weighting agent, ppb | 20 | 344.08 | 344.08 | 344.08 |
| Mixing & Aging Parameters | | 300° F. (149° C.) hot roll/16 hr | | |
| Mixer Type/mixed volume | | Multimixer/1 bbl | | |
| Properties | | AHR | AHR | AHR |
| Rheology @120° F. (49° C.) | | | | |
| 600 rpm | | 50 | 72 | 50 |
| 300 rpm | | 27 | 41 | 28 |
| 200 rpm | | 20 | 31 | 19 |
| 100 rpm | | 13 | 20 | 12 |
| 6 rpm | | 4 | 6 | 4 |
| 3 rpm | | 3 | 5 | 3 |
| PV, cP | | 23 | 31 | 22 |
| YP, lb/100 ft² | | 4 | 10 | 6 |
| 10 sec gel strength, lb/100 ft² | | 4 | 6 | 4 |
| 10 min gel strength, lb/100 ft² | | 10 | 11 | 7 |
| ES, volts | | 432 | 450 | 391 |
| HT/HP fluid loss at 300° F. (149° C.), filter paper | | | | |
| Total fluid loss, mL | | 17.6 | 3.0 | 6.8 |
| Filtrate Reduction, % | | | 83.0% | 61.4% |

As can be seen in Table 2, after hot rolling, the fully sulfonated castor oil ("TRO") performed slightly less effectively as the synthetic fluid loss control additive—possibly due to an increased activation of the synthetic FLCA from hot rolling. Moreover, the rheological profile, plastic viscosity, yield point, and gel strengths of the TRO were better than the synthetic FLCA and very similar to the control fluid without any fluid loss control additive.

TABLE 3

(Mud Weight 14 ppg, OWR 75:25, varying WPS)

| Products (In order of addition) | Time (min) | 1 WPS: 270K ppm | 2 WPS: 310K ppm |
|---|---|---|---|
| Base oil, ppb | 5 | 142.6 | 142.34 |
| Emulsifier, ppb | | 12 | 12 |

TABLE 3-continued

| (Mud Weight 14 ppg, OWR 75:25, varying WPS) | | | |
|---|---|---|---|
| Lime, ppb | 5 | 2 | 2 |
| Water, ppb | 10 | 60.17 | 59.91 |
| CaCl$_2$, ppb | | 23.31 | 28.14 |
| TRO FLCA, ppb | 5 | 5 | 5 |
| Suspension agent, ppb | 5 | 5 | 5 |
| Rheology modifier, ppb | 10 | 0.5 | 0.5 |
| Weighting agent, ppb | 20 | 337.51 | 333.1 |
| Mixer Type/mixed volume | Multimixer/1 bbl, HR 300° F. (149° C.)/16 h | | |

| Properties | | | | |
|---|---|---|---|---|
| Rheology @120° F. (49° C.) | BHR | AHR | BHR | AHR |
| 600 rpm | 56 | 48 | 54 | 49 |
| 300 rpm | 33 | 26 | 32 | 27 |
| 200 rpm | 25 | 19 | 24 | 19 |
| 100 rpm | 17 | 12 | 17 | 12 |
| 6 rpm | 6 | 3 | 6 | 3 |
| 3 rpm | 5 | 2 | 5 | 2 |
| PV, cP | 23 | 22 | 22 | 22 |
| YP, lb/100 ft$^2$ | 10 | 4 | 10 | 5 |
| 10 sec gel strength, lb/100 ft$^2$ | 6 | 3 | 6 | 3 |
| 10 min gel strength, lb/100 ft$^2$ | | 4 | | 4 |
| ES, volts | 397 | 424 | 392 | 505 |

| HT/HP Fluid loss at 300° F. (149° C.) | | |
|---|---|---|
| Total fluid loss, mL | 4.8 | 9.6 |
| Filtrate Reduction, % | 72.7% | 45.5% |

The data in Table 3 were used to evaluate the water phase salinity and its effect on the TRO. As can be seen in Table 3, after hot rolling and at a WPS of 270,000 ppm, the total fluid loss was 4.8 mL compared to 6.8 as shown in Table 2. The total fluid loss at a WPS of 310,000 ppm was higher than shown in Table 2. While still a very low amount of fluid loss, this shows that the WPS can be tailored to provide the desired fluid loss control based on the specific fluid formulation and concentration of the TRO. Moreover, the filtrate reduction of 73% at a WPS of 270,000 ppm shows excellent performance of TRO in the internal olefin base oil—being only 10% less than the 83% filtrate reduction value for the best performing synthetic FLCA.

Table 4 compares a control, the synthetic FLCA, and TRO FLCA using a different base oil than Tables 1-3. The base oil for the data in Tables 1-3 was an isomerized internal olefin. The base oil for the data in Table 4 was a non-aromatic, high boiling point range, petroleum distillate base. The isomerized internal olefin would represent typical fluids for use in U.S. Gulf of Mexico offshore activity; whereas the non-aromatic, high boiling point range, petroleum distillate base is more typical of North Sea offshore fluid compositions for zero discharge use. All of the products included in the TRO fluid formulations are accepted ingredients having a Yellow band as being acceptable for use in North Sea waters.

TABLE 4

| (Mud Weight 13.2 ppg, OWR 75:25, WPS 250,000 ppm) | | | | |
|---|---|---|---|---|
| Products | Control | Synthetic | TRO | TRO |
| Base Oil, ppb | 152.61 | 150.65 | 150.65 | 150.65 |
| Water, ppb | 62.08 | 61.28 | 61.28 | 61.28 |
| Calcium chloride, ppb | 21.56 | 21.56 | 21.56 | 21.56 |
| Emulsifier, ppb | 12 | 12 | 12 | 12 |
| Lime, ppb | 4 | 4 | 4 | 4 |
| FLCA, ppb | 0 | 3.5 | 3.50 | 5.250 |
| Suspension aid 1, ppb | 3 | 3 | 3 | 3 |
| Suspension aid 2, ppb | 10 | 10 | 10 | 10 |
| Weighting agent, ppb | 267.15 | 266.67 | 266.67 | 266.67 |
| Rheology modifier, ppb | 2 | 2 | 2 | 2 |
| Hymod Prima Clay, ppb | 20 | 20 | 20 | 20 |
| Aging Conditions | Hot roll 16 hr at 300° F. (149° C.) | | | |

| Rheology at 120° F. (49° C.) | BHR | AHR | BHR | AHR | BHR | AHR | BHR | AHR |
|---|---|---|---|---|---|---|---|---|
| 600 rpm | 58 | 60 | 79 | 76 | 59 | 59 | 57 | 55 |
| 300 rpm | 34 | 35 | 45 | 44 | 33 | 34 | 32 | 31 |
| 200 rpm | 25 | 25 | 33 | 32 | 24 | 23 | 23 | 21 |
| 100 rpm | 16 | 16 | 20 | 20 | 14 | 14 | 13 | 13 |
| 6 rpm | 6 | 5 | 6 | 5 | 5 | 4 | 3 | 4 |
| 3 rpm | 5 | 4 | 5 | 4 | 4 | 3 | 3 | 3 |
| 10 s gel, lb/100 ft$^2$ | 8 | 9 | 7 | 8 | 4 | 7 | 4 | 6 |
| 10 m gel, lb/100 ft$^2$ | 58 | 29 | 56 | 24 | 42 | 19 | 38 | 10 |
| Plastic Viscosity, cP | 24 | 25 | 34 | 32 | 26 | 25 | 25 | 24 |

TABLE 4-continued (Mud Weight 13.2 ppg, OWR 75:25, WPS 250,000 ppm)

| | | | | | | | | |
|---|---|---|---|---|---|---|---|---|
| Yield Point, lb/100 ft² | 10 | 10 | 11 | 12 | 7 | 9 | 7 | 7 |
| ES @ 120° F., volts | 219 | 360 | 339 | 403 | 258 | 306 | 225 | 221 |
| HP/HT Filtrate @ 300° F. | | | | | | | | |
| Total Fluid Loss, mL | | 15.2 | | 2.8 | | 4.8 | | 2.8 |
| Filtrate Reduction, % | | | | 81.6% | | 68.4% | | 81.6% |

As Table 4 illustrates, the control fluid resulted in a relatively high filtrate value after hot rolling. The synthetic FLCA had an 81.6% filtrate reduction compared to the control fluid. The TRO FLCA at the same concentration as the synthetic had a 68.4% filtrate reduction, which is still a very good reduction. When the concentration of the TRO increased to 5.25 pounds, the filtrate reduction was identical to the synthetic FLCA. This indicates that the concentration of the chemically modified vegetable oil can be adjusted to provide the desired fluid loss control. Moreover, different solubilities of the ingredients are observed according to differences in the base fluids, so variances in FLCA performance metrics are often observed as a result. For example, the total fluid loss after hot rolling for the TRO at a concentration of 3.5 ppb was 4.8 mL in Table 4 but was 6.8 mL at a concentration of 5 ppb as shown in Table 2. This indicates that the base oil for the invert emulsion base fluid can affect the amount of fluid loss and the concentration of the chemically modified vegetable oil can be adjusted depending on the base oil for a specific treatment fluid. Additionally, the viscosity readings showed elevated values in particular for the synthetic FLCA from 100 rpm to 600 rpm. These elevated values may not be desirable for some oil and gas operations where a lower viscosity fluid system is required to minimize downhole pressure buildup. Therefore, the addition of TRO as a substitute FLCA in this fluid system shows favorable results in terms of the functional performance, lack of potentially negative side effects on other properties, and its improved environmental profile.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more ingredients, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a continuous phase comprising a hydrocarbon liquid;
   a discontinuous phase comprising water and a water-soluble salt; and
   a fluid loss control additive, wherein the fluid loss control additive is a water-insoluble vegetable oil, wherein one or more functional groups of the vegetable oil are chemically modified to form a chemically modified vegetable oil, and wherein the fluid loss control additive comprises Turkey red oil,
   wherein the treatment fluid has a high-pressure, high-temperature fluid loss less than 15 milliliters per 30 minutes at a testing temperature in the range of 93.3° C. to 176.7° C. and a testing pressure of 500 psi (3.45 MPa), and wherein the treatment fluid has a water phase salinity in the range of 100,000 to 400,000 parts per million.

2. The treatment fluid according to claim 1, wherein the hydrocarbon liquid is selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

3. The treatment fluid according to claim 1, wherein the water is selected from the group consisting of freshwater, seawater, brine, and any combination thereof in any proportion.

4. The treatment fluid according to claim 1, wherein the water-soluble salt is a monovalent salt or divalent salt selected from the group consisting of sodium chloride, calcium chloride, calcium bromide, potassium chloride, potassium bromide, magnesium chloride, sodium formate, potassium formate, cesium formate, zinc bromide, and any combination thereof.

5. The treatment fluid according to claim 1, wherein the treatment fluid is an (Original) invert emulsion having an oil-to-water ratio in the range of 60:40 to 90:10.

6. The treatment fluid according to claim 1, wherein the vegetable oil is castor oil.

7. The treatment fluid according to claim 1, wherein the fluid loss control additive is biodegradable.

8. The treatment fluid according to claim 1, wherein chemical modification is sulfonation of the one or more functional groups of the vegetable oil.

9. The treatment fluid according to claim 1, wherein the fluid loss control additive is in a concentration in the range of 0.2 to 10 pounds per barrel (0.8 to 38.7 kilograms per cubic meter) of the base fluid.

10. The treatment fluid according to claim 1, wherein the fluid loss control additive is configured to react with the water-soluble salt to form a wax-like complex.

11. The treatment fluid according to claim 10, wherein the chemically modified vegetable oil contains fatty acid functional groups configured to react with the water-soluble salt to form the wax-like complex.

12. The treatment fluid according to claim 1, wherein a test treatment fluid provides a filtrate reduction compared to a control test fluid in the range of 40% to 100%.

13. The treatment fluid according to claim 1, wherein the treatment fluid has a plastic viscosity in the range of 10 to 90 centipoise at a temperature of 120° F. (48.9° C.).

14. The treatment fluid according to claim 1, wherein the treatment fluid has a yield point in the range of 2 to 30 lb/100 ft² (0.96 to 14.36 Pascals) at a temperature of 120° F. (48.9° C.).

15. A method of treating a portion of a subterranean formation comprising:
    introducing a treatment fluid into a wellbore that penetrates the subterranean formation,
    the treatment fluid comprising:
        a continuous phase comprising a hydrocarbon liquid;
        a discontinuous phase comprising water and a water-soluble salt; and
        a fluid loss control additive, wherein the fluid loss control additive is a water-insoluble vegetable oil, and wherein one or more functional groups of the vegetable oil are chemically modified to form a chemically modified vegetable oil, and wherein the fluid loss control additive comprises Turkey red oil, wherein the treatment fluid has a high-pressure, high-temperature fluid loss less than 15 milliliters per 30 minutes at a testing temperature in the range of 93.3° C. to 176.7° C. and a testing pressure of 500 psi (3.45 MPa), and wherein the treatment fluid has a water phase salinity in the range of 100,000 to 400,000 parts per million; and
    causing or allowing the fluid loss control additive to reduce fluid loss of the continuous phase and the discontinuous phase of the treatment fluid into the subterranean formation.

16. The method according to claim 15, wherein the fluid loss control additive is configured to react with the water-soluble salt to form a wax-like complex.

17. The method according to claim 16, wherein the wellbore has a bottomhole temperature less than a melting point of the wax-like complex.

18. The method according to claim 15, wherein less than 40% of the continuous phase and the discontinuous phase of the treatment fluid by volume is lost through permeable areas of the subterranean formation.

19. The method according to claim 15, wherein the fluid loss control additive is in a concentration in the range of 0.2 to 10 pounds per barrel (0.8 to 38.7 kilograms per cubic meter) of the base fluid.

20. The method according to claim 15, wherein the fluid loss control additive is biodegradable.

* * * * *